United States Patent [19]

Stemmler

[11] 4,236,108

[45] Nov. 25, 1980

[54] VARIABLE PHASE-SHIFTING TRANSFORMER NETWORK

[75] Inventor: Herbert Stemmler, Kirchdorf, Switzerland

[73] Assignee: BBC Brown, Boveri & Company, Limited, Baden, Switzerland

[21] Appl. No.: 6,228

[22] Filed: Jan. 24, 1979

[30] Foreign Application Priority Data

Apr. 10, 1978 [CH] Switzerland .......................... 3807/78

[51] Int. Cl.³ .................................................. H02J 3/18

[52] U.S. Cl. ........................................ 323/114; 307/17

[58] Field of Search .............................. 307/17, 98, 99; 323/43.5 R, 43.5 S, 114

[56] References Cited

U.S. PATENT DOCUMENTS 3,374,426 3/1968 Bedil .............................. 323/43.5 R 3,668,511 6/1972 Lewis .............................. 323/43.5 R

*Primary Examiner*—L. T. Hix

*Assistant Examiner*—S. D. Schreyer

*Attorney, Agent, or Firm*—Oblon, Fisher, Spivak, McClelland & Maier

[57] ABSTRACT

A variable phase-shifting transformer network including at least one pair of multi-phase transformers, wherein the network transformation ratio and phase shift is step wise adjustable as a result of the provision of plural auxiliary windings located on the core of a preselected secondary winding, each auxiliary winding having plural taps, which are not initially interconnected. Each transformer phase includes an AC semiconductor switch connected across selected tappings of the respective auxiliary windings via selected watt-less isolating switches. The voltage vector appearing across a selected secondary winding is varied by connecting an non-ignited semiconductor switch, via the isolating switches associated therewith, to desired tappings of the respective auxiliary windings while the rectifier is non-current conducting. Thereupon this AC semiconductor switch is ignited and ignition pulses are removed from the previously conducting semiconductor switch.

5 Claims, 5 Drawing Figures

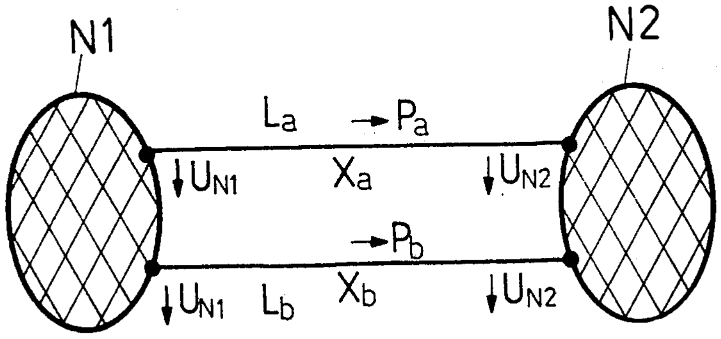
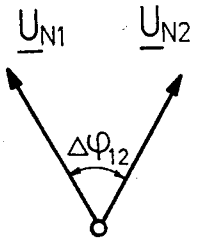
FIG.1b
FIG.1a
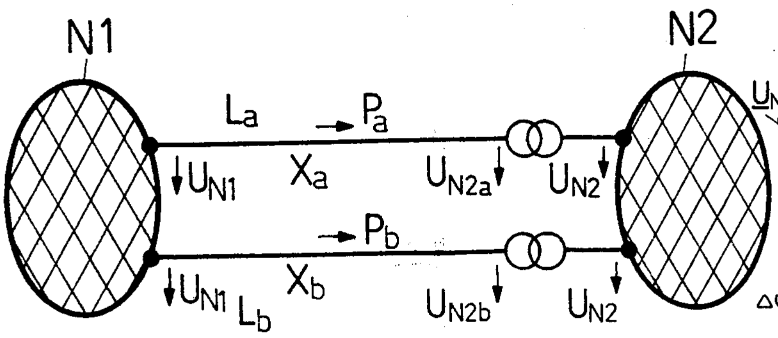
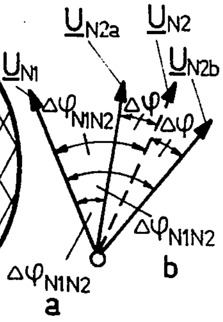
FIG.2b
FIG.2a

VARIABLE PHASE-SHIFTING TRANSFORMER NETWORK

BACKGROUND OF THE INVENTION

1. Field of the Invention

The invention relates to a variable phase-shifting transformer network for the stepwise adjustment of the transformation ratio as well as the phase shift of a signal applied to transmission lines, there being allocated to the main winding of each transformer phase additional auxiliary windings located either on the core of the same phase or the core of an adjacent phase, each auxiliary winding being provided with taps, one of the auxiliary windings being connected to the main winding, and all the auxiliary windings being initially not connected to one another.

2. Description of the Prior Art

In order to be able to control the flow of active power in an intermeshed network in a desired manner, transformers exhibiting an adjustable transformation ratio and phase shift are used. Nowadays such adjustment is accomplished by means of stepped switches which are however subject to wear and are therefore not satisfactory.

Regarding the problem of regulating the energy flow in intermeshed high-tension networks by means of special transformers for longitudinal, diagonal and transverse control, reference is made to "Brown Boveri Mitteilungen" No. 8 (1972), pages 376–383.

SUMMARY OF THE INVENTION

Accordingly, it is the object of this invention to avoid the disadvantages described above of existing transformer networks.

It is a further object of this invention to provide a novel variable phase-shifting transformer network without using stepping switches, to effect the stepwise adjustment of the transformation ratio and the phase shift.

These and other objects are achieved according to the invention by providing a novel variable phase-shifting transformer network, wherein for each phase thereof, an AC semiconductor switch is employed, each such switch having one terminal connected to a tap, or to the beginning or the end, of an auxiliary winding and, another terminal connected to the tap, or to the beginning or the end, of an other auxiliary winding via wattless isolating switches.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1*a* is a schematic diagram of a power transmission network illustrating the flow of active power in network transmission lines;

FIG. 1*b* is a phase diagram of voltages appearing at selected points in the network of FIG. 1*a;*

FIG. 2*a* is a schematic diagram of a power transmission network as shown in FIG. 1*a*, with a relative phase shift introduced between respective voltages;

FIG. 2*b* is a phasor diagram of the voltages at selected points in FIG. 2*a;* and, FIG. 3 is a schematic circuit diagram of a variable phase-shift transformer network according to the invention.

DETAILED DESCRIPTION OF THE PREFERRED EMBODIMENTS

Figure 3:
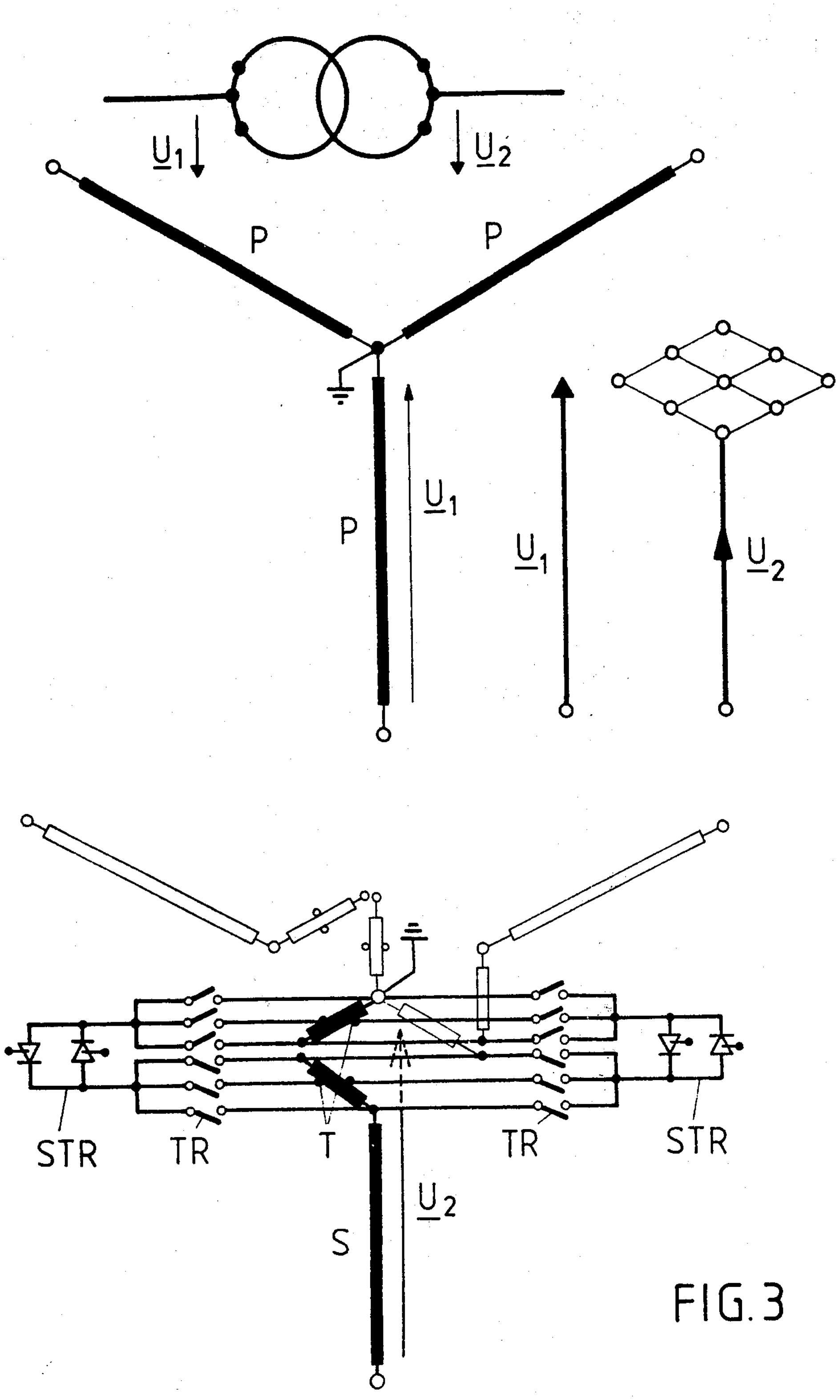

Referring now to the drawings, wherein like reference designations represent identical or corresponding signals and/or elements throughout the several views, and more particularly to FIG. 1*a* thereof, the invention is described in further detail by presenting a simple example, of how the flow of active power in a network can be controlled by means of phase-shifting transformers.

As is well known, the active power P transmitted via a line section having the impedance X, is $$P = U_1 U_2 / X \sin\Delta\phi_{12} \rightarrow p \approx U_1 U_2 / X \Delta\phi_2$$

wherein:

$U_1$ is the amplitude of the line input voltage $U_2$ is the amplitude of the line output voltage X is the series impedance of the line $\phi_{12}$ is the angle between the input and output voltage vectors.

Let us assume that two networks N1 and N2 (consisting of loads and power generators) are connected via two lines $L_a$ and $L_b$ having the impedances $X_a$ and $X_b$.

The voltage vectors in the locations 1 and 2 may have the magnitudes and phase shift indicated in FIG. 1. The active power transmitted over the lines $L_a$ and $L_b$ from network 1 to network 2 will then be:

$$p_a \approx \frac{U_{N1} U_{N2}}{X_a} \Delta\phi\, N1N2$$

$$p_b \approx \frac{U_{N1} U_{N2}}{X_b} \Delta\phi\, N1N2$$

$$p = p_a + p_b \approx U_{N1} U_{N2} \Delta\phi\, 12 \left( \frac{1}{X_a} + \frac{1}{X_b} \right)$$

Assuming the impedances $X_a$ and $X_b$ to be equal to X, half the power is transmitted in this case over each of the two lines $L_a$ and $L_b$.

If it is desired to transmit over line $L_b$ a larger, and over line $L_a$ a smaller part of the overall power, which smaller power part is meant to remain constant, then this can be achieved by arranging a transformer $ST_a$ and $ST_b$ with adjustable phase shift in each of the two lines.

If the secondary voltage vector in the transformer $ST_a$ is shifted to the left by $\Delta\phi$, and in transformer $ST_b$ is shifted to the right by $\Delta\phi$, see FIG. 2, then we obtain for the transmitted power:

$$p_a \approx \frac{U_{N1} U_{N2a}}{X_a} \Delta\phi_{aN1N2} \approx \frac{U_{N1} U_{N2a}}{X_a} (\Delta\phi_{N1N2} - \Delta\phi) \qquad p_b \approx \frac{U_{N1} U_{N2b}}{X_b} \Delta\phi_{bN1N2} \approx \frac{U_{N1} U_{N2b}}{X_b} (\Delta\phi_{N1N2} + \Delta\phi)$$

This example shows that the power whose sum total has been preserved, is being transmitted—as desired—to a higher degree via the line $L_b$ and to a lower degree via the line $L_a$.

The principle of the phase-shifting transformer network, which, according to the invention, is controlled by AC semiconductor switches, is now explained by way of an example with reference to FIG. 3, many subsidiary variations of the principle being feasible.

To the transformer input is applied the voltage $U_1$ (vector). Let us assume that the voltage $U_2$ on the secondary side of the transformer is to be varied stepwise in amplitude and phase in relation to $U_1$.

The primary winding P of the transformer is star-connected, with a grounded star point conductor as is customary with very high tension transformers.

The transformer secondary winding S is basically also star-connected, with a grounded star point conductor but in this case, two additional auxiliary windings T are allocated to the main winding of each phase. The auxiliary windings are located on the core of the adjacent phase and each have additional taps. One auxiliary winding T is connected to the main winding, the other is connected to the grounded star point. Neither of the two auxiliary windings is at first connected to the other auxiliary winding.

In addition there is provided for each phase an AC semiconductor switch STR which can be formed by two current rectifiers connected in an anti-parallel configuration. Each thyristor has one terminal connected to a tap (or to the beginning or the end) of one auxiliary winding and, another terminal, connected to the tap (or to the beginning or the end) of the other auxiliary winding, via isolating switches TR.

At selected times one of the two converters of each phase is connected via two associated isolating switches, with a predetermined tap (or the beginning or the end) of the two transformer auxiliary windings.

The semiconductor switches are permanently ignited during operation. This means that on the secondary side of the transformer, a voltage vector appears which corresponds to the chosen tapping.

If it is desired to vary the secondary voltage vector $U_2$ in amplitude and/or phase, first the semiconductor switch which has not yet been ignited is connected, via the isolating switches associated therewith, to the desired tapping of the two auxiliary windings while it is still without current. Then this second current semiconductor switch is ignited (continuous or quasi-continuous pulses) and the pulses are removed from the first such switch.

Commutation of the current from one semiconductor switch to the other takes place within one half period.

Normally the semiconductor switches are arranged on the low-potential side of the transformer winding. Conditions permitting, the converters may also be provided as single triacs, instead of thyristors in anti-parallel configuration.

The switch controlled phase-shifting transformer of the invention is characterized by the following additional properties:

(1) the semiconductor switches are always either fully turned on or fully turned off and therefore do not generate harmonics; and (2) the semiconductor switch rating is only a fraction of the transformer rating.

Due to the fact that the converters are arranged on the low-potential side, problems of insulating strength and ignition pulse transmission and similar problems are very easily solvable.

Increasing the number of steps, i.e. the possibility of fine adjustment of amplitude and phase shift, does not require a larger number of semiconductor switches, but it does require a larger number of watt-less isolating switches.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable phase-shifting transformer network wherein the network transformation ratio and phase shift is stepwise adjustable, said network having at least one pair of multiphase transformers with plural primary windings and plural secondary windings interconnected over transmission lines and being star-connected with a grounded star point conductor, comprising:

each secondary winding having plural auxiliary windings located on the core of a preselected secondary winding, each auxiliary winding having plural taps, one of said auxiliary windings connected to a respective secondary winding, the other of said auxiliary windings being connected to said grounded star point and all said auxiliary windings initially not connected to one another;

plural watt-less isolating switches; and, each transformer phase provided with at least one AC semiconductor switch having one terminal connected to a preselected tap of a particular auxiliary winding, and another terminal connected to another tap of an auxiliary winding via said watt-less isolating switches; said at least one AC semiconductor switch being comprised of a pair of thyristors connected in an anti-parallel configuration.

2. A network according to claim 1, further comprising:

each transformer phase having two AC semiconductor switches;

at times one of the two semiconductor switches of each phase is always connected, via two associated isolating switches, to a predetermined tap of a transformer auxiliary winding;

wherein one of the two semiconductor switches, during operation, is permanently ignited, and in order to vary the amplitude and/or phase of the secondary voltage vector a semiconductor switch which has not as yet been ignited is connected to selected tappings of the auxiliary windings via its associated isolating switches while still without current, and subsequently this particular semiconductor switch is ignited while the ignition pulses are removed from the other semiconductor switch which was turned on initially.

3. A network according to claim 2, wherein the commutation of current from one to the other semiconductor switch takes place within one half period.

4. A network according to claim 1 further comprising:

at least one of the semiconductor switches connected to the low-potential side of the associated transformer winding.

5. A network according to claim 1 wherein said at least one semiconductor switch comprises:

a triac.

* * * * *